June 17, 1930.   G. J. HOUTS ET AL   1,764,629

APPARATUS FOR SUPPORTING STRANDS

Filed April 27, 1925   2 Sheets-Sheet 1

Inventor
Guy J. Houts
Edward P. Tournier
John F. Wulff
by H. A. Mattison Att'y.

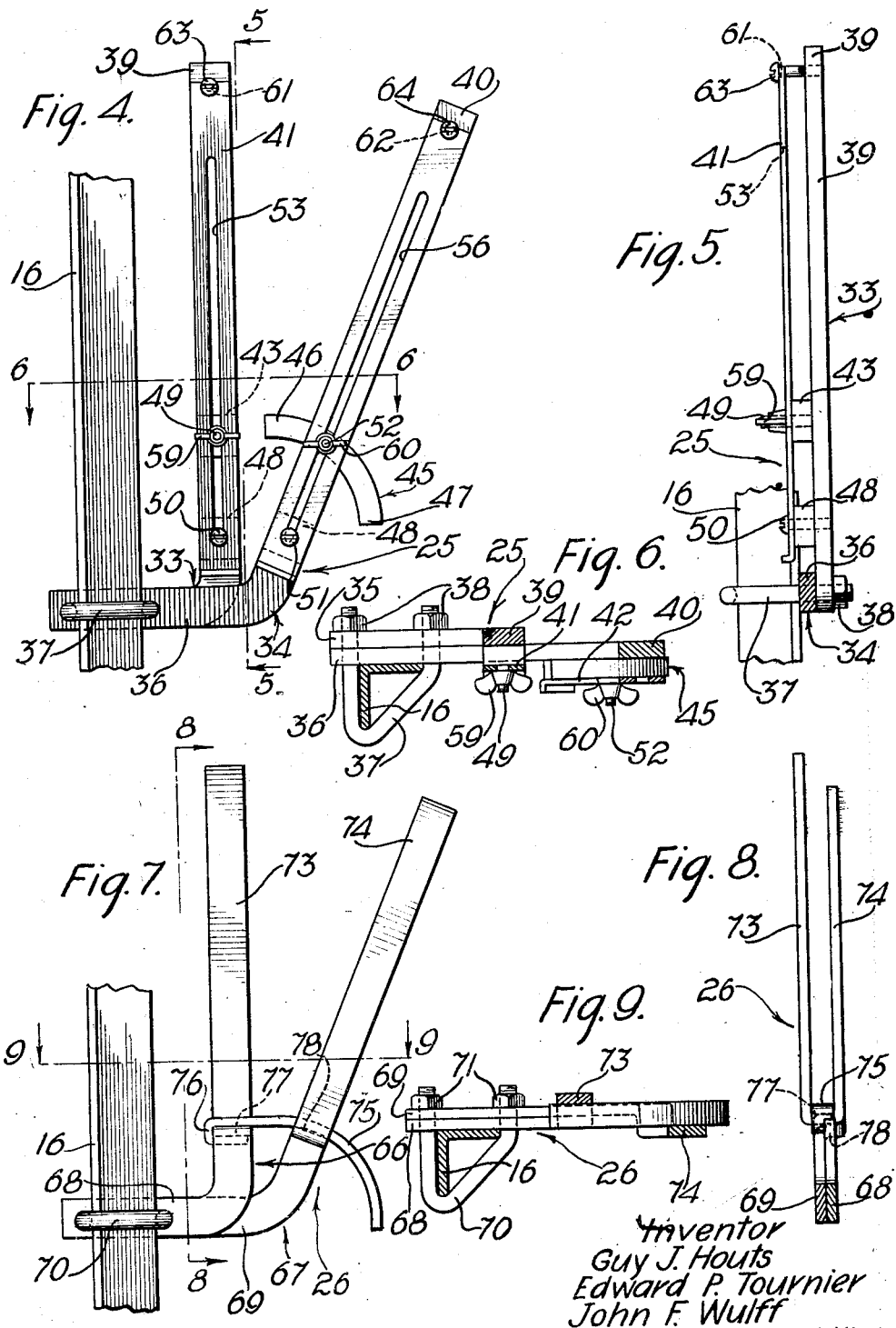

Patented June 17, 1930

1,764,629

UNITED STATES PATENT OFFICE

GUY JOSEPH HOUTS, OF OAK PARK; EDWARD PAUL TOURNIER, OF CHICAGO; AND JOHN FREDERICK WULFF, OF OAK PARK, ILLINOIS, ASSIGNORS TO WESTERN ELECTRIC COMPANY, INCORPORATED, OF NEW YORK, N. Y., A CORPORATION OF NEW YORK

APPARATUS FOR SUPPORTING STRANDS

Application filed April 27, 1925. Serial No. 26,063.

This invention relates to apparatus for supporting strands, and more particularly to apparatus for supporting and guiding strands or cables interconnecting telephone apparatus.

When interconnecting electrical apparatus such as is employed in telephone exchanges, it is frequently the practice to assemble the individual electrical conductors or cables, passing from one group of apparatus to another, into units, commonly called cable runs, which are attached to and supported by suitable framework. Especially when interconnecting telephone apparatus it is sometimes convenient and frequently necessary to turn several cables from a horizontal cable run positioned on one side of a frame into a vertical cable run positioned on the opposite side thereof. It has heretofore been the practice, in some instances, to support the cables passing from a horizontal run to a vertical run by fastening them to each other in vertical layers by means of textile strands, such as twine. This method is somewhat slow and requires experience and a high degree of skill on the part of the workman.

Objects of the present invention are to provide improved apparatus for readily and efficiently guiding and supporting strands or cables interconnecting telephone apparatus.

One embodiment of the invention consists in embracing predetermined numbers of cables by means of U-shaped metal clips and interconnecting the open ends of the clips by a metal strand to form a self supporting unit. In modified forms of the invention a group of cables is guided and supported between a plurality of spaced members, either relatively fixed or adjustable, attached to a supporting framework and suitably fastened at one end to an arcuate shaped member which serves as a rest or support for the cables as they pass from a horizontal run to a vertical run.

Other features of the invention will become apparent in the following detailed description, reference being had to the accompanying drawings, wherein—

Fig. 4 is a side elevation of a modified form of apparatus embodying the features of the invention;

Figs. 5 and 6 are detail sections taken on the lines 5—5 and 6—6 respectively of Fig. 4;

Fig. 7 is a side elevation of another form of apparatus embodying the features of the invention, and Figs. 8 and 9 are detail sections taken on the lines 8—8 and 9—9 respectively of Fig. 7.

The invention as herein illustrated and described is particularly adapted for fastening and guiding cables passing from a horizontal run positioned on the horizontal side of a telephone apparatus supporting and distributing frame, into a vertical run positioned on the vertical side thereof. It should be understood, however, that the invention is capable of other applications and should be limited only by the scope of the appended claims.

Figure 1:
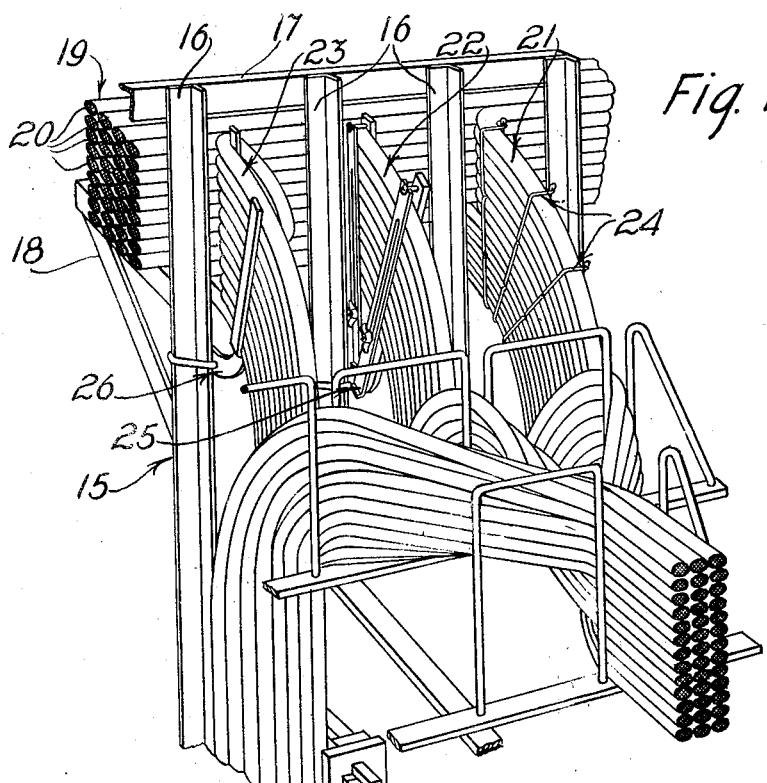
Fig. 1 is a perspective view of a portion of a distributing frame, such as is frequently employed in telephone exchanges for supporting telephone apparatus, illustrating several types of apparatus for supporting and guiding cables turning from a horizontal to a vertical run.

Referring now to the drawings in detail and particularly to Fig. 1 thereof, 15 indicates, generally, a portion of a distributing frame such as is commonly employed in telephone exchanges for supporting telephone apparatus. The frame 15 comprises, essentially, a plurality of vertical angle irons 16, which are interconnected and rigidly supported at the top by a horizontal angle iron 17. Suitably supported by the angle irons 16 is a horizontal rack or support 18 upon which is carried a horizontal run 19 of cables 20. Vertical cable runs 21, 22 and 23, each comprising a group or column of cables 20 passing from the horizontal cable run 19, are guided and supported by the several types of apparatus indicated at 24, 25 and 26 respectively.

Figure 2:
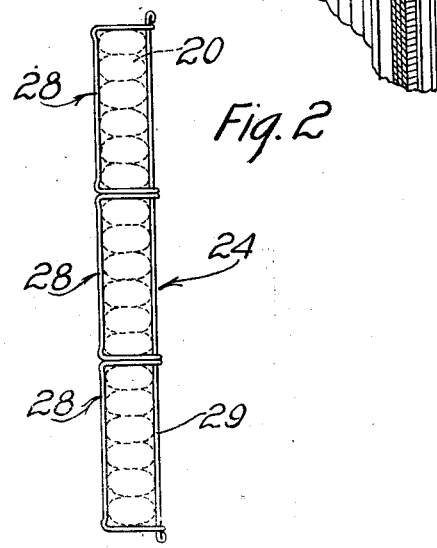
Fig. 2 is a detail view of one form of apparatus embodying the features of the present invention.
Figure 3:
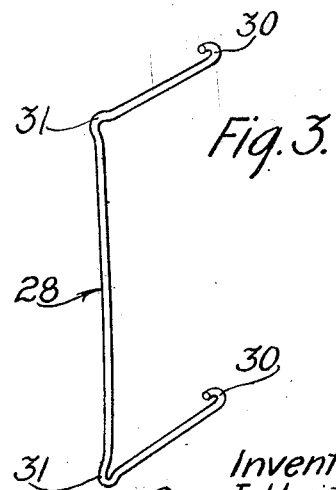
Fig. 3 is a perspective view of a metal clip which is adapted to embrace a predetermined number of cables.

The apparatus 24 comprises a plurality of U-shaped metal clips 28 (Figs. 2 and 3) which are adapted to embrace predetermined numbers of cables 20 and fasten them to a plurality of radially disposed metal strands 29 thereby forming the self supporting group of cables 21. When necessary, additional cables may be fastened, in a similar manner, to the clips supporting the first unit of cables. The clips 28 are provided with hooked portions 30 by which they may be fastened to the strand 29 or to similar clips embracing previously supported cables. Looped portions 31 formed in each of the clips 28 serve as a means for attaching similar clips embracing additional cables. For further illustration and description of the clips 28, reference may be had to the copending application of G. J. Houts, Serial No. 745,093, filed October 22, 1924. When employing this type of cable supporting apparatus the cables may be assembled in any convenient manner with the clips 28 enclosing units thereof and having their hooked portions engaging the metal strand 29.

The apparatus 25 (Figs. 4, 5 and 6) comprises a pair of angular members 33 and 34, arms 35 and 36 thereof being fastened to each other and adjustably secured to the angle iron 16 by means of a suitably formed U-bolt like member 37 which is threaded at each end to receive a nut 38 and which member may be secured in any desired position along the angle iron 16. Arms 39 and 40 of the members 33 and 34 are radially disposed with respect to each other and cooperate with similarly disposed members 41 and 42, respectively, to guide the group of cables 22 and arrange them in a vertical row while turning from the horizontal run 19. The member 41 and the arm 39 are suitably spaced from each other by spacing blocks 43 and 48 so that they engage opposite sides of the cable run 22. In a somewhat similar manner, the member 42 and the arm 40 are suitably spaced from each other by a block 48 and an arcuate shaped member 45. An end 46 of the member 45 terminates in a horizontal plane and is in alignment with the top surfaces of the block 43 and supporting shelf 18 while another end of the member 47 terminates in a substantially vertical plane. The cable run 22, upon turning from the bottom layer of the horizontal cable run 19 is supported by the block 43 and also by the member 45. Threaded or otherwise secured to the blocks 43 and 48 associated with the member 41 are machine screws 49 and 50 respectively and likewise secured to the block 48 and member 45 associated with the member 42 are machine screws 51 and 52, respectively. The member 41 is provided with a central slot 53 extending lengthwise thereof and through which the screws 49 and 50, respectively, extend whereby the member 41 may be adjusted lengthwise with respect to the arm 39. The member 42 is likewise provided with a slot 56 through which screws 51 and 52, respectively, project whereby the member 42 may be adjusted lengthwise with respect to the arm 40. Thumb nuts 59 and 60 engaging the screws 49 and 52, respectively, serve to secure the members 41 and 42 in any desired position with respect to the arms 39 and 40, respectively. Provided at the top of the members 41 and 42 are arcuate slots 61 and 62, respectively, the walls of which are adapted to engage screws 63 and 64 secured near the top of the arms 39 and 40, respectively.

When employing the above described apparatus the members 41 and 42 are moved to their lowermost position wherein the upper ends of the slots 53 and 56 engage the screws 49 and 52, respectively. As the cables are stacked one above the other to form the vertical rows against the arms 39 and 40 the members 41 and 42 are moved upwardly step by step to engage each cable as it is positioned. When the complete row of cables have been properly positioned, the members 41 and 42 are moved to their uppermost position, wherein the walls of the slots 61 and 62 engage the screws 63 and 64. The thumb nuts 59 and 60 are then tightened to secure and maintain the members 41 and 42 in place.

Referring now to Figs. 7, 8, and 9, the apparatus 26 comprises, essentially, a pair of angular members 66 and 67, having arms 68 and 69 which are fastened to each other and are adjustably secured at any desired point to an angle iron 16 by means of a suitably formed member 70, similar to member 37, which is threaded at each end to receive a nut 71. Arms 73 and 74 of the members 66 and 67, respectively, are radially disposed with respect to each other and are formed so that they are suitably spaced from each other to engage opposite sides of the cable run 23 at separated points therealong. An arcuate shaped member 75 is provided at one end with a hooked portion 76 by which it is attached to a horizontal portion 77 of the arm 73. The member 75 is also supported by a right angle portion 78 formed in the arm 74. In practicing the invention the cables in the run 23 are threaded between the arms 73 and 74 the lowest cable being formed around and resting upon the arcuate shaped member 75.

It is evident that by employing cable supporting devices of any of the forms disclosed, the cables are securely and rigidly maintained in position.

What is claimed is:

1. In an apparatus for guiding and supporting strands passing from a horizontal layer into a vertical row, means for supporting the strands in a horizontal layer, a pair of spaced members for guiding and maintaining the strands in a vertical row, an arcuate shaped support positioned near the bottom of said members and between them for supporting the strands in said row, and means for adjusting the arcuate support longitudinally of the spaced members.

2. In an apparatus for guiding and supporting a plurality of cables interconnecting a horizontal layer and a vertical row, a pair of spaced uprights for maintaining the cables in a vertical row, means for adjusting one of said uprights lengthwise with respect to the other, and an arcuate shaped member positioned near the bottom of said uprights and between them for supporting the cables in said vertical row.

3. In an apparatus for guiding and supporting a plurality of cables passing from a horizontal layer into a vertical row, a plurality of radially disposed arms arranged in pairs for maintaining the cables in a vertical row, means for relatively adjusting the arms of each pair to cause them to engage opposite sides of the row, and an arcuate shaped member positioned near the bottom of said arms and between them for engaging the lowermost cable.

4. In an apparatus for guiding and supporting a plurality of strands, means for supporting the strands in substantially horizontal layers, means for guiding the horizontal layers into different formations comprising an arcuate support for the lowest strand, upright members for retaining the strands in superposed relation, and means for adjusting the arcuate support longitudinally of the upright members.

5. In an apparatus for guiding and supporting strands, means for supporting a plurality of horizontal layers of strands, and means for diverting some of the strands in a different path consisting of a pair of spaced members radiating from a common point and support and adjustable longitudinally of the support in accordance with the horizontal position of the horizontal layers.

6. In an apparatus for guiding and supporting cables interconnecting horizontal layers and vertical rows, a support, a pair of radially disposed arms adjustable longitudinally of the support for engaging opposite sides of the cables, and an arcuate shaped member positioned near one end of said arms and between them for supporting the cables.

In witness whereof, we hereunto subscribe our names this 15th day of April A. D., 1925.

GUY JOSEPH HOUTS.
EDWARD PAUL TOURNIER.
JOHN FREDERICK WULFF.